United States Patent
Gao et al.

(10) Patent No.: US 10,009,712 B2
(45) Date of Patent: Jun. 26, 2018

(54) METHOD AND DEVICE FOR SHORT RANGE UNICAST COMMUNICATION

(71) Applicant: BEIJING SPREADTRUM HI-TECH COMMUNICATIONS TECHNOLOGY CO., LTD., Beijing (CN)

(72) Inventors: Xinghang Gao, Shanghai (CN); Weijie Xu, Shanghai (CN); Zhengang Pan, Shanghai (CN)

(73) Assignee: BEIJING SPREADTRUM HI-TECH COMMUNICATIONS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/453,225

(22) Filed: Mar. 8, 2017

(65) Prior Publication Data

US 2017/0332189 A1   Nov. 16, 2017

(30) Foreign Application Priority Data

May 13, 2016   (CN) .......................... 2016 1 0320303

(51) Int. Cl.
  *H04W 4/00*   (2018.01)
  *H04W 28/02*   (2009.01)
(52) U.S. Cl.
  CPC .......... *H04W 4/008* (2013.01); *H04W 4/005* (2013.01); *H04W 4/70* (2018.02); *H04W 4/80* (2018.02); *H04W 28/0278* (2013.01)
(58) Field of Classification Search
  CPC .................................................. H04W 76/023

(Continued)

(56) References Cited

U.S. PATENT DOCUMENTS

| 2014/0321314 A1* | 10/2014 | Fodor | ................. | H04W 72/085 370/252 |
| 2015/0004901 A1* | 1/2015 | Agiwal | ............... | H04W 76/021 455/39 |

(Continued)

FOREIGN PATENT DOCUMENTS

| CN | 102763477 A | 10/2012 |
| CN | 104604322 A | 5/2015 |
| WO | 2016064525 A1 | 4/2016 |

OTHER PUBLICATIONS

First CN Office Action corresponding to Application No. 201610320303.0; dated May 3, 2018.

*Primary Examiner* — Wen Huang
(74) *Attorney, Agent, or Firm* — Cantor Colburn LLP

(57) ABSTRACT

A method and a device for the short range unicast communication, the method includes: receiving resource allocation request information from a terminal; in response to the resource allocation request information, when the terminal is an eMTC, configuring a reception resource pool for the terminal and informing the terminal about the configuration information of the reception resource pool; determining a destination terminal with which a transmitting terminal will directly communicate, and when the destination terminal is an eMTC terminal, allocating a transmission resource in a reception resource pool of the destination terminal to the transmitting terminal; and transmitting resource grant indication information to the transmitting terminal, where the resource grant indication information indicates the transmission resource and the destination terminal corresponding to the transmission resource. Accordingly, short range unicast communication with an eMTC terminal can be realized.

41 Claims, 4 Drawing Sheets

(58) Field of Classification Search
USPC .................................... 455/41.1, 41.2, 41.3
See application file for complete search history.

(56) References Cited

U.S. PATENT DOCUMENTS

| | | | |
|---|---|---|---|
| 2015/0271807 A1* | 9/2015 | Patil ................... | H04W 76/023 455/426.1 |
| 2016/0029359 A1* | 1/2016 | Agiwal .............. | H04W 76/066 370/329 |
| 2016/0112910 A1* | 4/2016 | Agiwal ............... | H04W 72/04 370/331 |
| 2016/0142987 A1* | 5/2016 | Blankenship ........... | H04L 5/003 370/350 |
| 2017/0013634 A1* | 1/2017 | Tsuboi ................ | H04W 76/023 |
| 2017/0064734 A1* | 3/2017 | Tsuboi ............. | H04W 72/1268 |
| 2017/0171837 A1* | 6/2017 | Chen .................... | H04W 72/04 |
| 2017/0230957 A1* | 8/2017 | Wakabayashi ........ | H04W 4/005 |

\* cited by examiner

METHOD AND DEVICE FOR SHORT RANGE UNICAST COMMUNICATION

CROSS-REFERENCE TO RELATED APPLICATIONS

This application claims the benefit of priority to Chinese Patent Application No. 201610320303.0, filed on May 13, 2016, and entitled "METHOD AND DEVICE FOR SHORT RANGE UNICAST COMMUNICATION", and the entire disclosure of which is incorporated herein by reference.

TECHNICAL FIELD

The present disclosure generally relates to communication technical field, and more particularly, to a method and a device for short range unicast communication.

BACKGROUND

D2D (Device-to-Device) communication is a new technology that allows UEs (User Equipments) to directly communicate by multiplexing cell resources, under control of a communication system. The D2D communication can increase spectral efficiency of a cellular communication system and reduce transmission power of the UE. Therefore, to a certain extent, the problem of lacking of spectral resource existed in wireless communication system can be solved.

The R13 version of the 3GPP (3rd Generation Partnership Project) protocol supports point-to-point unicast communication. The point-to-point unicast communication includes relay-related point-to-point unicast communication and non-relay-related point-to-point unicast communication. Direct communication between devices is a kind of short range communication. Before a terminal performs a D2D direct communication, a short range service authentication is required, and only when the short range service authentication has been passed, the direct communication can be carried out.

Further, narrow-band communications, such as eMTC (Enhancement Machine Type Communication), are supported in release-13. However, the exiting short range unicast communication technologies can not be applied to the narrowband terminals.

SUMMARY

Problem to be solved by the present disclosure includes: providing a short range unicast communication that can be applied to narrowband terminals.

In order to solve above recited problem, the present disclosure provides a method for short range unicast communication, including: receiving resource allocation request information from a terminal; in response to the resource allocation request information, when the terminal is an eMTC (Enhancement Machine Type Communication), configuring a reception resource pool for the terminal and informing the terminal about configuration information of the reception resource pool; determining a destination terminal with which a transmitting terminal will directly communicate, and when the destination terminal is an eMTC terminal, allocating a transmission resource in a reception resource pool of the destination terminal to the transmitting terminal; and the transmitting resource grant indication information to the transmitting terminal, where the resource grant indication information indicates the transmission resource and the destination terminal corresponding to the transmission resource.

In some embodiments, when the terminal is an eMTC terminal and before configuring a reception resource pool for the terminal, the method further includes: acquiring short range communication identification information of the terminal, so as to identify the terminal corresponding to the short range communication identification information.

In some embodiments, the short range communication identification information is included in the resource allocation request information.

In some embodiments, acquiring short range communication identification information of the terminal includes: receiving short range communication identification information of the terminal from a MME (Mobility Management Entity).

In some embodiments, the configuration information of the reception resource pool allocated is informed to the terminal via RRC (Radio Resource Control) reconfiguration information.

In some embodiments, the resource allocation request information carries an identification information list of at least one peer terminal of the terminal, and determining a destination terminal with which a transmitting terminal will directly communicate includes: determining the destination terminal with which the transmitting terminal will directly communicate according to the identification information list of the at least one peer terminal and a BSR (Buffer Status Report) from the transmitting terminal, where the identification information list of the at least one peer terminal includes short range communication identification information of each peer terminal.

In some embodiments, capability information reported by the terminal is used to determine whether or not the terminal is an eMTC terminal.

In some embodiments, a bandwidth resource indicated in the configuration information of the reception resource pool does not exceed six PRBs (Physical Resource Blocks).

In some embodiments, when the transmitting terminal is an eMTC terminal, a bandwidth resource in the transmission resource does not exceed six PRBs (Physical Resource Blocks).

In some embodiments, the resource grant indication information is included in DCI5 (5th Downlink Control Information) scrambled by a SL-RNTI (Sidelink-Radio Network Temporary Identification) or in predefined DCI (Downlink Control Information).

Embodiments of the present disclosure further provide a method for short range unicast communication, including: transmitting resource allocation request information to a base station, to request the base station to allocate a reception resource; receiving configuration information of a reception resource pool allocated to a terminal when the base station determines that the terminal is an eMTC (Enhancement Machine Type Communication); before transmitting data to a destination terminal, requesting the base station to allocate a transmission resource, so that the transmission resource allocated by the base station is in a reception resource of the destination terminal when the destination terminal is an eMTC; and receiving resource grant indication information from the base station, where the resource grant indication information indicates the transmission resource and the destination terminal corresponding to the transmission resource.

In some embodiments, the resource allocation request information further includes short range communication identification information of a current terminal.

In some embodiments, requesting the base station to allocate a transmission resource includes: transmitting a BSR (Buffer Status Report) to the base station, so that the base station determines the destination terminal according to the BSR and an identification information list of at least one peer terminal, where the identification information list of the at least one peer terminal is carried in the resource allocation request information, and the identification information list of the at least one peer terminal includes short range communication identification information of each peer terminal.

In some embodiments, the resource grant indication information is included in DCI5 (5th Downlink Control Information) scrambled by a SL-RNTI (Sidelink-Radio Network Temporary Identification) or in predefined DCI (Downlink Control Information).

Embodiments of the present disclosure further provide a device for short range unicast communication, including: a resource allocation request information receiving circuitry configured to: receive resource allocation request information from a terminal; a reception resource pool configuring circuitry configured to: in response to the resource allocation request information, when the terminal is an eMTC (Enhancement Machine Type Communication), configure a reception resource pool for the terminal and inform the terminal about configuration information of the reception resource pool; a transmission resource allocating circuitry configured to: determine a destination terminal with which a transmitting terminal will directly communicate, and when the destination terminal is an eMTC terminal, allocate a transmission resource in a reception resource pool of the destination terminal to the transmitting terminal; and an indicating circuitry configured to: transmit resource grant indication information to the transmitting terminal, wherein the resource grant indication information indicates the transmission resource and the destination terminal corresponding to the transmission resource.

In some embodiments, the device further includes: a terminal identification information acquiring circuitry configured to: when the terminal is an eMTC terminal and before configuring a reception resource pool for the terminal, acquire short range communication identification information of the terminal, so as to identify the terminal corresponding to the short range communication identification information.

In some embodiments, the short range communication identification information is included in the resource allocation request information.

In some embodiments, the terminal identification information acquiring circuitry includes a receiving sub-circuitry which is configured to: receive short range communication identification information of the terminal allocated by a MME (Mobility Management Entity).

In some embodiments, the configuration information of the reception resource pool allocated is informed to the terminal via RRC (Radio Resource Control) reconfiguration information.

In some embodiments, the resource allocation request information carries an identification information list of at least one peer terminal of the terminal, the transmission resource allocating circuitry is configured to: determine the destination terminal with which the transmitting terminal will directly communicate according to the identification information list and a BSR (Buffer Status Report) from the transmitting terminal, and the identification information list of the at least one peer terminal includes short range communication identification information of each peer terminal.

In some embodiments, the reception resource pool configuring circuitry is configured to: determine whether or not the terminal is an eMTC terminal based on capability information reported by the terminal.

In some embodiments, a bandwidth resource indicated in the configuration information of the reception resource pool does not exceed six PRBs (Physical Resource Blocks).

In some embodiments, when the transmitting terminal is an eMTC terminal, a bandwidth resource in the transmission resource does not exceed six PRBs (Physical Resource Blocks).

In some embodiments, the resource grant indication information is included in DCI5 (5th Downlink Control Information) scrambled by a SL-RNTI (Sidelink-Radio Network Temporary Identification) or in predefined DCI (Downlink Control Information).

Embodiments of the present disclosure further provide a device for short range unicast communication, including: a resource allocation request information transmitting circuitry configured to transmit resource allocation request information to a base station, so as to request the base station to allocate a reception resource; a reception resource pool configuration acquiring circuitry configured to receive configuration information of a reception resource pool allocated to a terminal when the base station determines that the terminal is an eMTC (Enhancement Machine Type Communication); a transmission resource allocation requesting circuitry configured to: before transmitting data to a destination terminal, request the base station to allocate a transmission resource, so that when the destination terminal is an eMTC, the transmission resource allocated by the base station is in a reception resource of the destination terminal; and an indication information receiving circuitry configured to receive resource grant indication information from the base station, wherein the resource grant indication information indicates the transmission resource and the destination terminal corresponding to the transmission resource.

In some embodiments, the resource allocation request information further includes short range communication identification information of a current terminal.

In some embodiments, the reception resource pool configuration acquiring circuitry is configured to: receive configuration information of the reception resource pool indicated by the base station via RRC (Radio Resource Control) reconfiguration information.

In some embodiments, the transmission resource allocation requesting circuitry includes: a transmitting sub-circuitry configured to transmit a BSR (Buffer Status Report) to the base station, so that the base station determines the destination terminal according to the BSR and an identification information list of at least one peer terminal, wherein the identification information list of the at least one peer terminal is carried in the resource allocation request information, and the identification information list of the at least one peer terminal includes short range communication identification information of each peer terminal.

In some embodiments, the resource grant indication information is included in DCI5 (5th Downlink Control Information) scrambled by a SL-RNTI (Sidelink-Radio Network Temporary Identification) or in predefined DCI (Downlink Control Information).

In comparison with exiting technologies, technical solutions according to embodiments of the present disclosure possess the following advantages.

In the present disclosure, when a terminal is determined as an eMTC terminal, a reception resource pool will be allocated to the terminal; and when the terminal needs to transmit data to a destination terminal, if the destination terminal is an eMTC terminal, the base station allocates a transmission resource in the reception resource pool of the destination terminal to the transmitting terminal. Thus, it is ensured that the transmitting terminal transmits data according to the transmission resource allocated and the eMTC terminal serving as the destination terminal receives data from the transmitting terminal according to the reception resource pool. Accordingly, the short range unicast communication with an eMTC terminal can be realized.

Further, when the transmitting terminal is an eMTC terminal, by restricting the transmission resource allocated for the transmitting terminal, even if the destination terminal is not an eMTC terminal, the eMTC terminal and the destination terminal can realize short range unicast communication.

Further, in embodiments of the present disclosure, by associating the short range communication identification information with the corresponding terminal, the base station can identify the corresponding terminal according to the short range communication identification information. Thus, after the reception resource pool is allocated to the terminal according to the short range communication identification information, the base station can be prevented from allocating the scheduling transmission resource to the terminal. Therefore, the problem of resource conflict can be avoided.

DETAILED DESCRIPTION

As recited in the background, narrow-band communications, such as eMTC (Enhancement Machine Type Communication) and NB-IoT (Narrow Band Internet of Thing), are supported in release-13. However, the exiting short range unicast communication technologies can not be applied to the narrow-band terminal.

Inventors of the present disclosure find that, in the existing short range unicast communication technologies, a receiving end needs to monitor all reception resource pools indicated by SIB18 (System Information Block 18) at the same time, so as to receive data. However, according to the current capability of the eMTC, the number of PRBs (Physical Resource Blocks) for data transmission/reception should not exceed six. Further, the eMTC terminal does not support a reception of SIB18, thus the eMTC terminal can not learn a location of data from the transmitting terminal, and therefore can not correctly receive the data.

In order to solve above recited problem, in the present disclosure, when a terminal is determined as an eMTC, a reception resource pool is configured for the terminal; and when a terminal needs to transmit data to a destination terminal, if the destination terminal is determined as an eMTC, a base station allocates a transmission resource in the reception resource pool of the destination terminal to the transmitting terminal. By such a way, the transmitting terminal can transmit data according to the allocated transmission resource, and the eMTC terminal, which serves as the destination terminal, can receive data from the transmitting terminal according to the reception resource pool. Accordingly, short range unicast communication with an eMTC terminal can be realized.

In order to make above recited objectives, features and advantages of the present disclosure clear and easy to understand, embodiments of the present disclosure will be illustrated in detailed as follows in combination with corresponding drawings.

Figure 1:
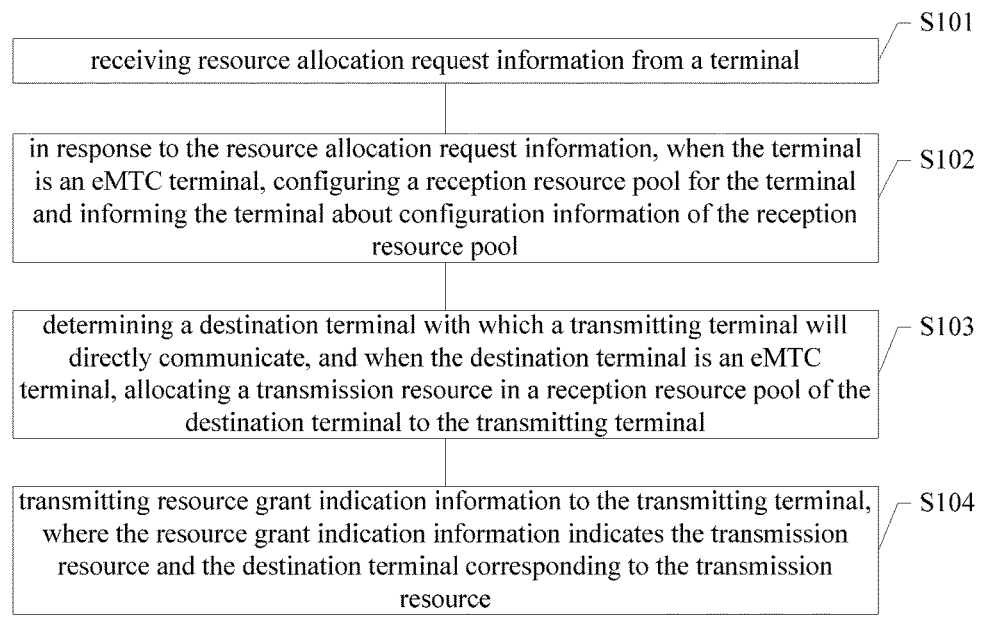
FIG. 1 schematically illustrates a flow chart of a method for short range unicast communication according to one embodiment of the present disclosure.

FIG. 1 is a flow chart of a method for short range unicast communication which can be applied to a base station side. Referring to FIG. 1, the method includes following steps from S101 to S103.

In step S101: receiving resource allocation request information from a terminal.

In some embodiments, when the terminal transmits resource allocation request information (i.e., Sidelink UE information), it indicates that the terminal is interested in short range unicast communication and intends to acquire a resource for performing short range unicast communication. The resource may include a bandwidth resource, a time domain resource and so on. Each terminal can request the base station to allocate a reception resource for receiving data by transmitting resource allocation request information to the base station.

In step S102: in response to the resource allocation request information, when the terminal is an eMTC (Enhancement Machine Type Communication) terminal, configuring a reception resource pool for the terminal and informing the terminal about configuration information of the reception resource pool.

In some embodiments, when the resource allocation request information reported by the terminal is received, if the terminal is determined as the eMTC terminal, a reception resource will be allocated to the eMTC terminal. In some embodiments, capability information reported by the terminal may be used to determine whether or not the terminal is an eMTC terminal.

In some embodiments, when the terminal reporting the resource allocation request information is an eMTC terminal, since the eMTC terminal only supports a narrow-band data transmission and is only able to receive data in bandwidths of at most six PRBs (Physical Resource Blocks) in one sub-frame, thus a bandwidth configured for the eMTC terminal does not exceed six PRBs.

In some embodiments, a SA (Schedule Assignment) resource pool received by the eMTC terminal is semi-statically configured. Configuration information of the resource pool may include: an available sub-frame of SA transmission, a starting sub-frame of the SA resource pool, a bandwidth resource which is no more than six PRBs and a starting location or an ending location of the resource pool. In some embodiments of the present disclosure, the SA resource pool and a data resource pool of the eMTC terminal may also be semi-statically configured.

In some embodiments, the configuration information of the reception resource pool allocated may be informed to the terminal via RRC (Radio Resource Control) reconfiguration information.

In embodiments of the present disclosure, by configuring the reception resource pool, the eMTC terminal can clearly learn about the location of data from the transmitting terminal.

In step S103: determining a destination terminal with which a transmitting terminal will directly communicate, and when the destination terminal is an eMTC terminal, allocating a transmission resource in a reception resource pool of the destination terminal to the transmitting terminal.

Similarly, the capability information reported by the terminal may be used to determine whether or not the terminal is an eMTC terminal.

In some embodiments, when a terminal serves as a transmitting terminal to transmit data to a specific receiving terminal, the receiving terminal is the destination terminal with which the transmitting terminal will directly communicate. After the destination terminal is determined, the base station can allocate a transmission resource in the reception resource pool of the destination terminal to the transmitting terminal. Specifically, allocating the transmission resource in the reception resource pool of the destination terminal to the transmitting terminal means that a time domain and a frequency domain of the transmission resource allocated are subsets of a time domain and a frequency domain of the reception resource pool, respectively.

In embodiments of the present disclosure, by allocating the transmission resource in the reception resource pool of the destination terminal, the destination terminal can receive data transmitted from the transmitting terminal according to the configuration of the reception resource pool.

In the existing D2D (Device-to-Device) unicast communication technology, since the eMTC terminal does not support SIB18 (System Information Block 18), the eMTC terminal can not monitor the SIB18 to learn about a location of data from the transmitting terminal. However, in embodiments of the present disclosure, the location of the data received is no longer learned by monitoring the SIB18. Specifically, in the present disclosure, a reception resource is allocated to an eMTC terminal which requests to perform a short range unicast communication, and at the same time, when allocating a transmission resource to the transmitting terminal, if the destination terminal is an eMTC terminal, a transmission resource in the reception resource pool of the destination terminal is allocated to the transmitting terminal, so that the destination terminal can receive communication data from the transmitting terminal. Accordingly, the short range unicast communication with an eMTC terminal can be realized.

In some embodiments, when the transmitting terminal is an eMTC terminal, a bandwidth of the transmission resource configured should not exceed six PRBs. By such a way, when the transmitting terminal is an eMTC terminal, by restricting the transmission resource allocated to the transmitting terminal, even if the destination terminal is not an eMTC terminal, a short range unicast communication between the eMTC terminal and the destination terminal can be realized.

In step S104: transmitting resource grant indication information to the transmitting terminal, where the resource grant indication information indicates the transmission resource and the destination terminal corresponding to the transmission resource.

In some embodiments, by transmitting the resource grant indication information to the transmitting terminal, it is possible to make the transmitting terminal clearly learn about the currently allocated transmission resource and the corresponding destination terminal thereof. Thereafter, the transmitting terminal may transmit data to the corresponding destination terminal based on the transmission resource.

Figure 2:
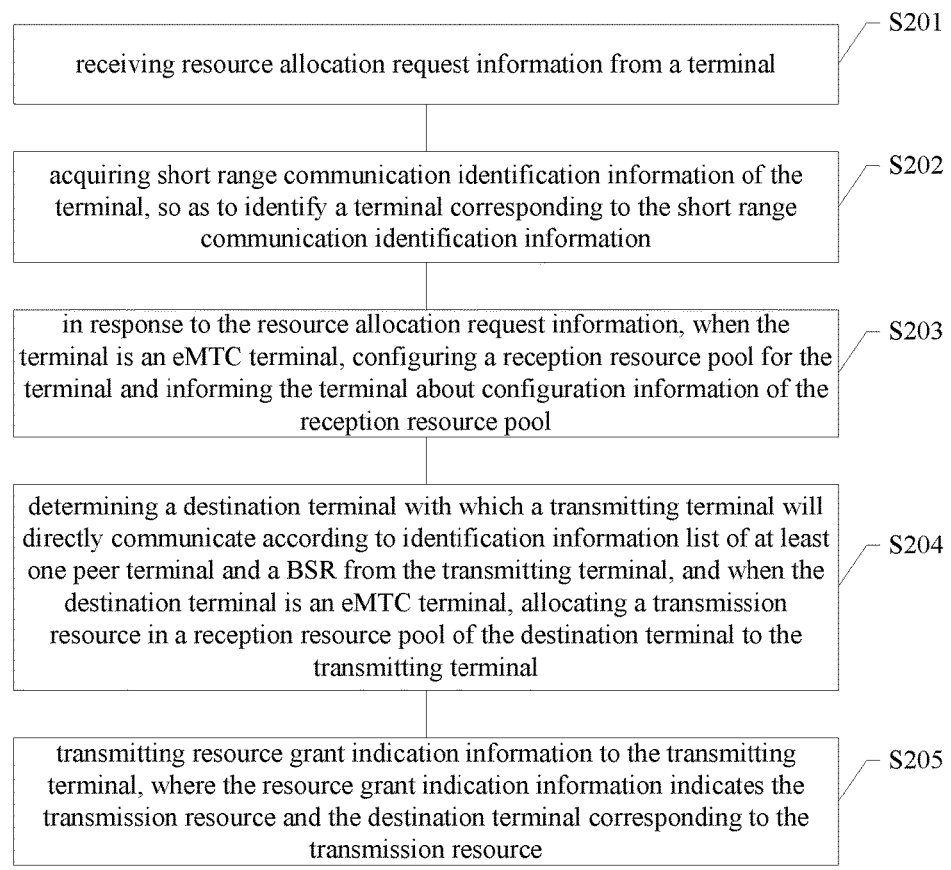
FIG. 2 schematically illustrates a flow chart of a method for short range unicast communication according to another embodiment of the present disclosure.

Details of a method for short range unicast communication of the present disclosure will be described with reference to FIG. 2. FIG. 2 illustrates specific steps of the method for short range unicast communication according to one embodiment of the present disclosure.

In step S201: receiving resource allocation request information from a terminal.

In some embodiments, the resource allocation request information (i.e., Sidelink UE Information) received by a base station includes an identification information list of at least one peer terminal reported by the terminal. The at least one peer terminal is opposite to the current terminal, in particular, it is the peer end of the current terminal intending to perform short range unicast communication. The at least one peer terminal of the terminal may include a plurality of peer terminals. The identification information list may include short range communication identification information of each peer terminal and corresponding index information in the list. For example, the short range communication identification information may be a layer2-ID (Layer 2-link Identification) allocated by MME for the short range communication.

For example, a first terminal intends to perform the short range unicast communication with a second terminal, a third terminal and a fourth terminal, wherein the second terminal, the third terminal and the fourth terminal are all peer terminals of the first terminal. The identification information list of the peer terminals of the first terminal includes the short range communication identification information of the second terminal, the third terminal and the fourth terminal, and the corresponding index information.

In step S203: in response to the resource allocation request information, when the terminal is an eMTC (Enhancement Machine Type Communication) terminal, configuring a reception resource pool for the terminal and informing the terminal about configuration information of the reception resource pool.

Specific implementation of Step S203 can refer to descriptions of Step S102 in FIG. 1, which will not be described in detail herein.

In Step S204: determining a destination terminal with which a transmitting terminal will directly communicate according to identification information list of at least one peer terminal and a BSR (Buffer Status Report) from the transmitting terminal, and when the destination terminal is an eMTC terminal, allocating a transmission resource in a reception resource pool of the destination terminal to the transmitting terminal.

In some embodiments, when the terminal serving as the transmitting terminal needs to transmit data to a specific destination terminal, a BSR will be transmitted to the base station. Since the BSR indicates the index information of the destination terminal, the base station can query the identification information list of the at least one peer terminal to determine the destination terminal. After the base station determines the destination terminal, a transmission resource in the reception resource pool of the destination terminal may be allocated to the transmitting terminal. Accordingly, in embodiments of the present disclosure, by configuring the transmission resource to match with the reception resource, the eMTC terminal, which serves as the destination terminal, can accurately receive communication data from the transmitting terminal. Therefore, the short range unicast communication with an eMTC terminal can be realized.

In some embodiments, when the transmitting terminal is an eMTC terminal, a bandwidth of the transmission resource configured does not exceed six PRBs. Thus, when the transmitting terminal is an eMTC terminal, by restricting the transmission resource allocated to the transmitting terminal, even if the destination terminal is not an eMTC terminal, the eMTC terminal serving as the transmitting terminal and the destination terminal can realize short range unicast communication.

In some embodiments, the identification information of the at least one peer terminal may be obtained in a direct discovery procedure of the short range communication of the current terminal.

In step S205: transmitting resource grant indication information to the transmitting terminal, where the resource grant indication information indicates the transmission resource and the destination terminal corresponding to the transmission resource.

In some embodiments, the resource grant indication information may be included in DCI5 (5th Downlink Control Information) scrambled by a SL-RNTI (Sidelink-Radio Network Temporary Identification) or in predefined DCI (Downlink Control Information). Specifically, a value indicated in the BSR may be added to the DCI5, or may be included in the DCI of a newly defined format.

In some embodiments, when the terminal is an eMTC terminal, before configuring the reception resource pool for the terminal, step S202 is implemented.

In step S202: acquiring short range communication identification information of the terminal, so as to identify a terminal corresponding to the short range communication identification information.

In some embodiments, the short range communication identification information is allocated by a prose function entity of the short range communication, after an authentication for the terminal is implemented. The prose function entity is coupled with a HSS (Home Signing Server), the HSS is coupled with a MME (Mobility Management Entity), and the prose function entity is coupled with the terminal.

In some embodiments, the short range communication identification information of the terminal is included in the resource allocation request information. In other words, when the terminal transmits the resource allocation request information to the base station, it transmits the short range communication identification information of the terminal, in addition to the identification information list of the at least one peer terminal. The short range communication identification information reported is from the prose function entity and then allocated to the terminal after the authentication. Accordingly, each terminal can report its own short range communication identification information, thus it is possible to make the base station associate the short range communication identification information with a corresponding terminal.

In some embodiments, the short range communication identification information may be obtained from the MME (Mobility Management Entity). Specifically, the prose function entity allocates the short range communication identification information of the terminal after the authentication and transmits the short range communication identification information to the MME through the HSS. Then, the MME indicates the corresponding short range communication identification information of the specific terminal to the base station via an initial UE context setup or a UE context modification procedure. Accordingly, by indicating the short range communication identification information and the corresponding terminal to the base station via the MME, the base station can associate the short range communication identification information with the corresponding terminal.

In the present disclosure, when the terminal is determined as an eMTC terminal, a reception resource pool will be allocated to the terminal; and when the terminal needs to transmit data to a destination terminal, if the destination terminal is an eMTC terminal, the base station allocates a transmission resource in a reception resource pool of the destination terminal to the transmitting terminal. Thus, it is ensured that the transmitting terminal transmits data according to the allocated transmission resource and the eMTC terminal serving as the destination terminal can receive data from the transmitting terminal according to the reception resource pool. Accordingly, short range unicast communication with the eMTC terminal can be achieved.

Further, when the transmitting terminal is an eMTC terminal, the transmission resource allocated to the transmitting terminal is restricted not exceeding six PRBs (Physical Resource Blocks), even if the destination terminal is not an eMTC terminal, the eMTC terminal serving as the transmitting terminal and the destination terminal can realize short range unicast communication.

Further, in embodiments of the present disclosure, by associating the short range communication identification information with the corresponding terminal, the base station can identify the corresponding terminal according to the short range communication identification information. Thus, after the reception resource pool is allocated to the terminal according to the short range communication identification information, the base station can be prevented from allocating the scheduling transmission resource to the terminal. Therefore, the problem of resource conflict can be avoided.

Figure 3:
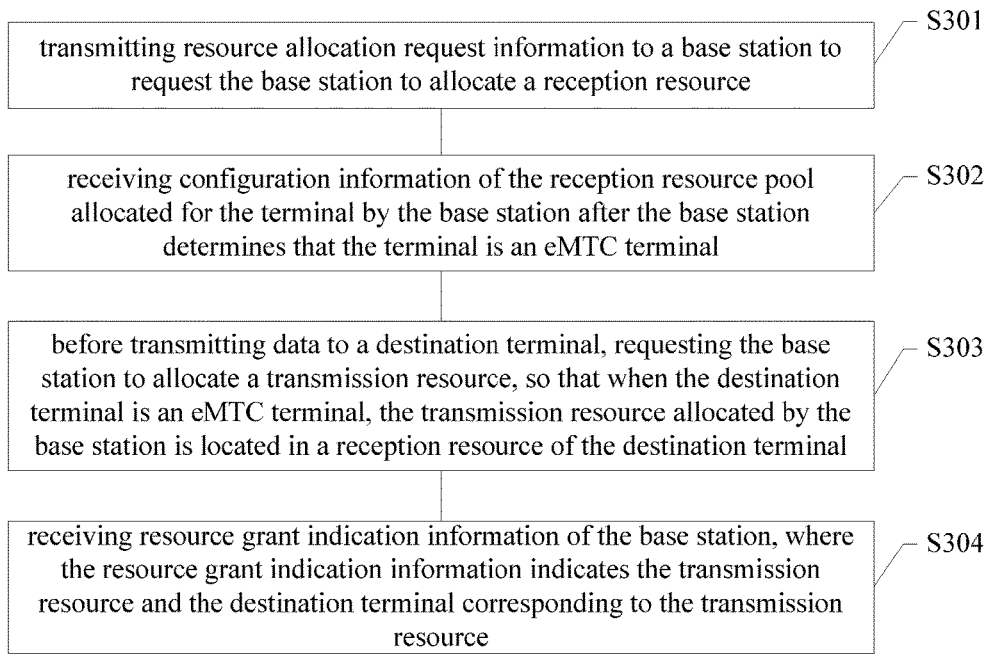
FIG. 3 schematically illustrates a flow chart of a method for short range unicast communication according to another embodiment of the present disclosure.

FIG. 3 is a flow chart of a method for short range unicast communication according to one embodiment of the present disclosure. Specific steps of the method for short range unicast communication will be described in detail with reference to FIG. 3 as following.

In step S301: transmitting resource allocation request information to a base station to request the base station to allocate a reception resource.

In some embodiments, the resource allocation request information includes an identification information list of at least one peer terminal of the current terminal and the short range communication identification information of the current terminal. By transmitting the short range communication identification information of the current terminal, the base station can identify the corresponding terminal.

In some embodiments, the short range communication identification information of each terminal is obtained by a prose function entity after an authentication is completed. The identification information list of the at least one peer terminal may include identification information of each peer terminal and corresponding index information in the list. The identification information of the peer terminal is obtained in a direct discovery procedure of the short range communication.

When the terminal transmits the resource allocation request information to the base station, it indicates that the terminal is interested in short range unicast communication and requests the base station to allocate a reception resource. When the base station receives the resource allocation request information, if the current terminal is determined as an eMTC (Enhancement Machine Type Communication)

terminal, a reception resource pool will be configured for the terminal, wherein the reception resource pool indicates a location of data from the transmitting terminal, and a bandwidth of the resource pool does not exceed six PRBs (Physical Resource Blocks).

In step S302: receiving configuration information of the reception resource pool allocated for the terminal by the base station after the base station determines that the terminal is an eMTC terminal.

In some embodiments, the configuration information of the reception resource pool may be acquired according to an indication of RRC (Radio Resource Control) reconfiguration information of the base station.

In step S303: before transmitting data to a destination terminal, requesting the base station to allocate a transmission resource, so that when the destination terminal is an eMTC terminal, the transmission resource allocated by the base station is located in a reception resource of the destination terminal.

In some embodiments, when the terminal needs to transmit data to a specific destination terminal, the current terminal serves as a transmitting terminal and requests the base station to allocate a transmission resource for the destination terminal.

In some embodiments, the transmitting terminal sends a BSR (Buffer Status Report) to the base station, wherein the BSR indicates index information of the destination terminal, so as to determine identification information of the destination terminal by querying, based on the BSR, identification information list of the destination terminal previously received. Thus, the destination terminal can be determined, and a transmission resource located in the reception resource pool of the destination terminal can be allocated to the transmitting terminal.

In step S304: receiving resource grant indication information from the base station, where the resource grant indication information indicates the transmission resource and the destination terminal corresponding to the transmission resource The resource grant indication information received from the base station indicates that the base station authorized the transmission resource for the transmitting terminal and indicates that the transmission resource is configured for a particular terminal.

In some embodiments, the resource grant indication information may be included in DCI5 (5th Downlink Control Information) scrambled by a SL-RNTI (Sidelink-Radio Network Temporary Identification) or in predefined DCI (Downlink Control Information). Specifically, a value indicated in the BSR may be added to the DCI5, or may be included in the DCI of a newly defined format.

The method for short range unicast communication as shown in FIG. 3 corresponds to the method for short range unicast communication as shown in FIG. 2. Implementing and advantages of the method for short range unicast communication as shown in FIG. 3 can refer to the method for short range unicast communication as shown in FIG. 2, which will not be descried herein.

Figure 4:
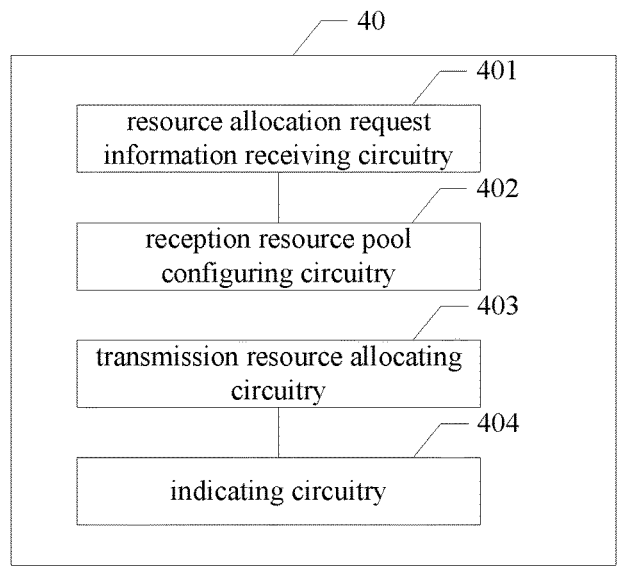
FIG. 4 schematically illustrates a structure of a device for short range unicast communication according to one embodiment of the present disclosure.

FIG. 4 is a schematic diagram of a structure of a device for short range unicast communication. As shown in FIG. 4, the device for short range unicast communication 40 may include following circuitries.

A resource allocation request information receiving circuitry 401 configured to: receive resource allocation request information from a terminal.

A reception resource pool configuring circuitry 402 configured to: in response to the resource allocation request information, when the terminal is an eMTC (Enhancement Machine Type Communication) terminal, configure a reception resource pool for the terminal and inform the terminal about configuration information of the reception resource pool.

A transmission resource allocating circuitry 403 configured to: determine a destination terminal with which a transmitting terminal will directly communicate, and when the destination terminal is an eMTC terminal, allocate a transmission resource in a reception resource pool of the destination terminal to the transmitting terminal.

An indicating circuitry 404 configured to: transmit resource grant indication information to the terminal, wherein the resource grant indication information indicates the transmission resource and the destination terminal corresponding to the transmission resource.

In some embodiments, the device for short range unicast communication 40 may further include a terminal identification information acquiring circuitry (not shown in FIG. 4) which is configured to: acquire, when the terminal is an eMTC terminal and before the terminal is configured with the reception resource pool, short range communication identification information of the terminal, so as to identify the terminal corresponding to the short range communication identification information.

In some embodiments, the short range communication identification information of the terminal is included in the resource allocation request information.

In some embodiments, the terminal identification information acquiring circuitry includes a receiving sub-circuitry which is configured to: receive the short range communication identification information of the terminal from a MME (Mobility Management Entity).

In some embodiments, the configuration information of the reception resource pool may be indicated to the terminal by RRC (Radio Resource Control) reconfiguration information.

In some embodiments, the short range communication identification information is allocated by a prose function entity, after an authentication. The prose function entity is coupled with a HSS (Home Signing Server), the HSS is coupled with a MME (Mobility Management Entity), and the prose function entity is coupled with the terminal.

In some embodiments, the identification information list of the at least one peer terminal is obtained in a direct discovery procedure of the short range communication of the terminal.

In some embodiments, capability information reported by the terminal is used to determine whether or not the terminal is an eMTC terminal.

In some embodiments, a bandwidth resource indicated in the configuration information of the reception resource pool does not exceed six PRBs (Physical Resource Blocks).

In some embodiments, when the transmitting terminal is an eMTC terminal, a bandwidth resource in the transmission resource does not exceed six PRBs.

In some embodiments, the resource grant indication information is included in DCI5 (5th Downlink Control Information) scrambled by a SL-RNTI (Sidelink-Radio Network Temporary Identification) or in predefined DCI (Downlink Control Information).

In some embodiments, the device for short range unicast communication 40 may be used for a base station, e.g., integrated in a base station or externally coupled to a base station.

The device for short range unicast communication as shown in FIG. 4 corresponds to the method for scheduling resource of short range unicast communication as shown in FIG. 1. Details and advantages of the device for short range unicast communication as shown in FIG. 4 can refer to the method for scheduling resource of short range unicast communication as shown in FIG. 1, which will not be descried herein.

Figure 5:
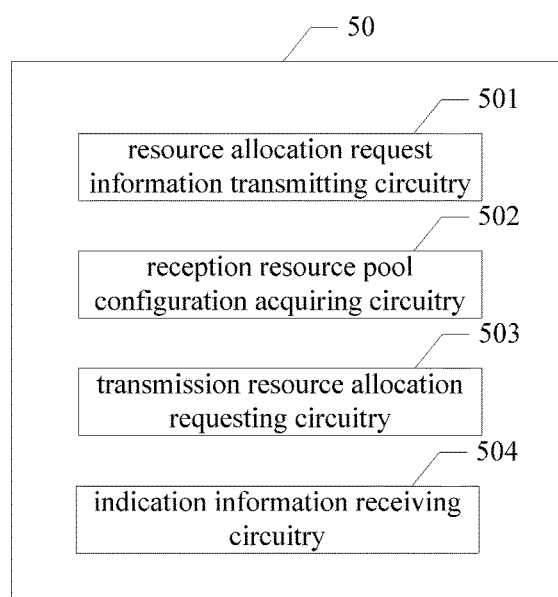
FIG. 5 schematically illustrates a structure of a device for short range unicast communication according to another embodiment of the present disclosure.

FIG. 5 is a schematic diagram of a structure of a device for short range unicast communication. As shown in FIG. 5, the device for short range unicast communication 50 may include following circuitries.

A resource allocation request information transmitting circuitry 501 configured to: transmit resource allocation request information to a base station, so as to request the base station to allocate a reception resource.

A reception resource pool configuration acquiring circuitry 502 configured to: receive configuration information of a reception resource pool allocated by the base station to the terminal when the base station determines that the terminal is an eMTC (Enhancement Machine Type Communication) terminal.

A transmission resource allocation requesting circuitry 503 configured to: before transmitting data to a destination terminal, request the base station to allocate a transmission resource, so that when the destination terminal is an eMTC terminal, the transmission resource allocated by the base station is located in a reception resource of the destination terminal.

An indication information receiving circuitry 504 configured to: receive resource grant indication information from the base station, wherein the resource grant indication information indicates the transmission resource and the destination terminal corresponding to the transmission resource.

In some embodiments, the reception resource pool configuration acquiring circuitry 502 may acquire the configuration information of the reception resource pool according to an indication of RRC (Radio Resource Control) reconfiguration information.

In some embodiments, the resource allocation request information may further include short range communication identification information of the current terminal.

In some embodiments, the transmission resource allocation requesting circuitry 504 includes a transmitting sub-circuitry which is configured to: transmit a BSR (Buffer Status Report) to the base station, so that the base station can determine the destination terminal according to the BSR and identification information list of at least one peer terminal, wherein the identification information list of the at least one peer terminal is carried in the resource allocation request information, and the identification information list of the at least one peer terminal includes the short range communication identification information of each peer terminal.

In some embodiments, the device for short range unicast communication 50 transmits capability information to the base station, so that the base station can determine whether or not the current terminal is an eMTC terminal.

In some embodiments, the resource grant indication information is included in DCI5 (5th Downlink Control Information) scrambled by a SL-RNTI (Sidelink-Radio Network Temporary Identification) or in predefined DCI (Downlink Control Information).

The device for short range unicast communication 50 as shown in FIG. 5 corresponds to the method for short range unicast communication as shown in FIG. 3. Details and advantages of the device for short range unicast communication 50 as shown in FIG. 5 can refer to the method for short range unicast communication as shown in FIG. 3, which will not be descried herein.

In some embodiments, the device for short range unicast communication 50 may be used in an eMTC terminal, e.g., integrated in an eMTC terminal or externally coupled to an eMTC terminal.

Those skilled in the art can understand that, all steps or some of the steps in various methods of above recited embodiments of the present disclosure can be accomplished by hardware under instruction of programs. The programs can be stored in a readable storage medium of a computer, wherein the storage medium may include: ROM (Read Only Memory), RAM (Random Access Memory), magnetic disk, light disk, etc.

Although the present disclosure has been disclosed above with reference to preferred embodiments thereof, it should be understood by those skilled in the art that various changes and modifications may be made without departing from the spirit or scope of the disclosure. Accordingly, the present disclosure covers changes and modifications made to the present disclosure that fall into scopes defined by the claims and equivalent technical solutions thereof.

The invention claimed is:

1. A method for short range unicast communication, comprising:
   receiving resource allocation request information from a terminal;
   acquiring short range communication identification information of the terminal, so as to identify the terminal corresponding to the short range communication identification information and associate the short range communication identification information with the corresponding terminal, in response to the resource allocation request information, determining whether or not the terminal is an eMTC terminal according to capability information reported by the terminal, when the terminal is an eMTC (Enhancement Machine Type Communication), configuring a reception resource pool for the terminal and informing the terminal about configuration information of the reception resource pool;
   determining a destination terminal with which a transmitting terminal will directly communicate, determining whether or not the destination terminal is an eMTC terminal according to capability information reported by the destination terminal, and when the destination terminal is an eMTC terminal, allocating a transmission resource in a reception resource pool of the destination terminal to the transmitting terminal; and
   transmitting resource grant indication information to the transmitting terminal, where the resource grant indication information indicates the transmission resource and the destination terminal corresponding to the transmission resource.

2. The method for short range unicast communication according to claim 1, wherein the short range communication identification information is comprised in the resource allocation request information.

3. The method for short range unicast communication according to claim 1, wherein acquiring short range communication identification information of the terminal comprises: receiving short range communication identification information of the terminal from a MIME (Mobility Management Entity).

4. The method for short range unicast communication according to claim 3, the configuration information of the reception resource pool allocated is informed to the terminal via RRC (Radio Resource Control) reconfiguration information.

5. The method for short range unicast communication according to claim 3, wherein the short range communication identification information of the terminal is allocated after the authentication and transmitted to the MME through HSS (Home Subscriber Server) by a prose function and is transmitted to the base station via an initial UE context setup or a UE context modification procedure by the MME.

6. The method for short range unicast communication according to claim 1, wherein the resource allocation request information carries an identification information list of at least one peer terminal of the terminal, and determining a destination terminal with which a transmitting terminal will directly communicate comprises: determining the destination terminal with which the transmitting terminal will directly communicate according to the identification information list of the at least one peer terminal and a BSR (Buffer Status Report) from the transmitting terminal, where the identification information list of the at least one peer terminal comprises short range communication identification information of each peer terminal.

7. The method for short range unicast communication according to claim 1, wherein a bandwidth resource indicated in the configuration information of the reception resource pool does not exceed six PRBs (Physical Resource Blocks).

8. The method for short range unicast communication according to claim 1, wherein when the transmitting terminal is an eMTC terminal, a bandwidth resource in the transmission resource does not exceed six PRBs (Physical Resource Blocks).

9. The method for short range unicast communication according to claim 1, wherein the resource grant indication information is comprised in DCI5 (5th Downlink Control Information) scrambled by a SL-RNTI (Sidelink-Radio Network Temporary Identification) or in predefined DCI (Downlink Control Information).

10. The method for short range unicast communication according to claim 1, wherein the configuration information of the reception resource pool comprises: an available sub-frame of a schedule assignment (SA) resource pool transmission, a starting sub-frame of the SA resource pool, a bandwidth resource which is no more than six PRBs and a starting location or an ending location of the resource pool.

11. The method for short range unicast communication according to claim 10, wherein only the SA resource pool is semi-statically configured.

12. The method for short range unicast communication according to claim 10, wherein the SA resource pool and a data resource pool of the eMTC terminal are both semi-statically configured.

13. The method for short range unicast communication according to claim 1, wherein a time domain and a frequency domain of the transmission resource allocated are subsets of a time domain and a frequency domain of the reception resource pool, respectively.

14. The method for short range unicast communication according to claim 1, wherein a time domain and a frequency domain of the transmission resource allocated are subsets of a time domain and a frequency domain of the reception resource pool, respectively.

15. A method for short range unicast communication, comprising:
transmitting resource allocation request information to a base station, to request the base station to allocate a reception resource; wherein the resource allocation request information further comprises short range communication identification information of a current terminal;
receiving configuration information of a reception resource pool allocated to a terminal when the base station determines that the terminal is an eMTC (Enhancement Machine Type Communication); wherein the base station determines whether or not the terminal is an eMTC terminal according to capability information reported by the terminal; wherein the base station acquires short range communication identification information of the terminal, so as to identify the terminal corresponding to the short range communication identification information and associate the short range communication identification information with the corresponding terminal;
before transmitting data to a destination terminal, requesting the base station to allocate a transmission resource, so that the transmission resource allocated by the base station is in a reception resource of the destination terminal if the destination terminal is an eMTC; wherein the base station determines whether or not the destination terminal is an eMTC terminal according to capability information reported by the destination terminal, and
receiving resource grant indication information from the base station, where the resource grant indication information indicates the transmission resource and the destination terminal corresponding to the transmission resource.

16. The method for short range unicast communication according to claim 15, wherein requesting the base station to allocate a transmission resource comprises:
transmitting a BSR (Buffer Status Report) to the base station, so that the base station determines the destination terminal according to the BSR and an identification information list of at least one peer terminal, where the identification information list of the at least one peer terminal is carried in the resource allocation request information, and the identification information list of the at least one peer terminal comprises short range communication identification information of each peer terminal.

17. The method for short range unicast communication according to claim 15, wherein the resource grant indication information is comprised in DCI5 (5th Downlink Control Information) scrambled by a SL-RNTI (Sidelink-Radio Network Temporary Identification) or in predefined DCI (Downlink Control Information).

18. The method for short range unicast communication according to claim 15, wherein the configuration information of the reception resource pool comprises: an available sub-frame of a schedule assignment (SA) resource pool transmission, a starting sub-frame of the SA resource pool, a bandwidth resource which is no more than six PRBs and a starting location or an ending location of the resource pool.

19. The method for short range unicast communication according to claim 18, wherein only the SA resource pool is semi-statically configured.

20. The method for short range unicast communication according to claim 18, wherein the SA resource pool and a data resource pool of the eMTC terminal are both semi-statically configured.

21. A device for short range unicast communication, comprising:

a resource allocation request information receiving circuitry configured to: receive resource allocation request information from a terminal;

a reception resource pool configuring circuitry configured to: acquire short range communication identification information of the terminal, so as to identify the terminal corresponding to the short range communication identification information and associate the short range communication identification information with the corresponding terminal, in response to the resource allocation request information, determine whether or not the terminal is an eMTC terminal based on capability information reported by the terminal, when the terminal is an eMTC (Enhancement Machine Type Communication), configure a reception resource pool for the terminal and inform the terminal about configuration information of the reception resource pool;

a transmission resource allocating circuitry configured to: determine a destination terminal with which a transmitting terminal will directly communicate, determining whether or not the destination terminal is an eMTC terminal according to capability information reported by the destination terminal, and when the destination terminal is an eMTC terminal, allocate a transmission resource in a reception resource pool of the destination terminal to the transmitting terminal; and an indicating circuitry configured to: transmit resource grant indication information to the transmitting terminal, wherein the resource grant indication information indicates the transmission resource and the corresponding destination terminal corresponding to the transmission resource.

22. The device for short range unicast communication according to claim 21, wherein the short range communication identification information is comprised in the resource allocation request information.

23. The device for short range unicast communication according to claim 21, wherein the terminal identification information acquiring circuitry comprises a receiving sub-circuitry which is configured to: receive short range communication identification information of the terminal allocated by a MME (Mobility Management Entity).

24. The device for short range unicast communication according to claim 23, wherein the short range communication identification information of the terminal is allocated after the authentication and transmitted to the MME through HSS (Home Subscriber Server) by a prose function and is transmitted to the base station via an initial UE context setup or a UE context modification procedure by the MME.

25. The device for short range unicast communication according to claim 21, wherein the configuration information of the reception resource pool allocated is informed to the terminal via RRC (Radio Resource Control) reconfiguration information.

26. The device for short range unicast communication according to claim 21, wherein the resource allocation request information carries an identification information list of at least one peer terminal of the terminal, the transmission resource allocating circuitry is configured to: determine the destination terminal with which the transmitting terminal will directly communicate according to the identification information list of the at least one peer terminals and a BSR (Buffer Status Report) from the transmitting terminal, and the identification information list of the at least one peer terminal comprises short range communication identification information of each peer terminal.

27. The device for short range unicast communication according to claim 21, wherein a bandwidth resource indicated in the configuration information of the reception resource pool does not exceed six PRBs (Physical Resource Blocks).

28. The device for short range unicast communication according to claim 21, wherein when the transmitting terminal is an eMTC terminal, a bandwidth resource in the transmission resource does not exceed six PRBs (Physical Resource Blocks).

29. The device for short range unicast communication according to claim 21, wherein the resource grant indication information is comprised in DCI5 (5th Downlink Control Information) scrambled by a SL-RNTI (Sidelink-Radio Network Temporary Identification) or in predefined DCI (Downlink Control Information).

30. The device for short range unicast communication according to claim 21, wherein the configuration information of the reception resource pool comprises: an available sub-frame of a schedule assignment (SA) resource pool transmission, a starting sub-frame of the SA resource pool, a bandwidth resource which is no more than six PRBs and a starting location or an ending location of the resource pool.

31. The device for short range unicast communication according to claim 30, wherein only the SA resource pool is semi-statically configured.

32. The device for short range unicast communication according to claim 30, wherein the SA resource pool and a data resource pool of the eMTC terminal are both semi-statically configured.

33. The device for short range unicast communication according to claim 21, wherein a time domain and a frequency domain of the transmission resource allocated are subsets of a time domain and a frequency domain of the reception resource pool, respectively.

34. A device for short range unicast communication, comprising:

a resource allocation request information transmitting circuitry configured to: transmit resource allocation request information to a base station, so as to request the base station to allocate a reception resource; wherein the resource allocation request information further comprises short range communication identification information of a current terminal;

a reception resource pool configuration acquiring circuitry configured to: receive configuration information of a reception resource pool allocated to a terminal when the base station determines that the terminal is an eMTC (Enhancement Machine Type Communication); wherein the base station determines whether or not the terminal is an eMTC terminal according to capability information reported by the terminal; wherein the base station acquires short range communication identification information of the terminal, so as to identify the terminal corresponding to the short range communication identification information and associate the short range communication identification information with the corresponding terminal;

a transmission resource allocation requesting circuitry configured to: before transmitting data to a destination terminal, request the base station to allocate a transmission resource, so that when the destination terminal is an eMTC, the transmission resource allocated by the base station is in a reception resource of the destination terminal; wherein the base station determines whether or not the destination terminal is an eMTC terminal according to capability information reported by the destination terminal, and an indication information receiving circuitry configured to: receive resource grant indication information from the base station, wherein the resource grant indication information indicates the transmission resource and the destination terminal corresponding to the transmission resource.

35. The device for short range unicast communication according to claim 34, wherein the reception resource pool configuration acquiring circuitry is configured to: receive configuration information of the reception resource pool indicated by the base station via RRC (Radio Resource Control) reconfiguration information.

36. The device for short range unicast communication according to claim 34, wherein the transmission resource allocation requesting circuitry comprises:

a transmitting sub-circuitry configured to: transmit a BSR (Buffer Status Report) to the base station, so that the base station determines the destination terminal according to the BSR and an identification information list of at least one peer terminal, wherein the identification information list of the at least one peer terminal is carried in the resource allocation request information, and the identification information list of the at least one peer terminal comprises short range communication identification information of each peer terminal.

37. The device for short range unicast communication according to claim 34, wherein the resource grant indication information is comprised in DCI5 (5th Downlink Control Information) of scrambled by a SL-RNTI (Sidelink-Radio Network Temporary Identification) or in predefined DCI (Downlink Control Information).

38. The device for short range unicast communication according to claim 34, wherein the configuration information of the reception resource pool comprises: an available sub-frame of a schedule assignment (SA) resource pool transmission, a starting sub-frame of the SA resource pool, a bandwidth resource which is no more than six PRBs and a starting location or an ending location of the resource pool.

39. The device for short range unicast communication according to claim 38, wherein only the SA resource pool is semi-statically configured.

40. The device for short range unicast communication according to claim 38, wherein the SA resource pool and a data resource pool of the eMTC terminal are both semi-statically configured.

41. The device for short range unicast communication according to claim 34, wherein a time domain and a frequency domain of the transmission resource allocated are subsets of a time domain and a frequency domain of the reception resource pool, respectively.

* * * * *